United States Patent
Soejima et al.

(10) Patent No.: US 12,127,568 B2
(45) Date of Patent: Oct. 29, 2024

(54) CHOCOLATE FOR FROZEN DESSERTS AND FROZEN DESSERTS

(71) Applicant: MEIJI CO., LTD., Tokyo (JP)

(72) Inventors: Masayuki Soejima, Tokyo (JP); Tomoko Takeuchi, Tokyo (JP); Masataka Ando, Tokyo (JP); Yo Ishihara, Tokyo (JP); Chihiro Takata, Tokyo (JP)

(73) Assignee: MEIJI CO., LTD., Tokyo (JP)

( * ) Notice: Subject to any disclaimer, the term of this patent is extended or adjusted under 35 U.S.C. 154(b) by 467 days.

(21) Appl. No.: 17/629,025

(22) PCT Filed: Jul. 22, 2020

(86) PCT No.: PCT/JP2020/028496
§ 371 (c)(1),
(2) Date: Jan. 21, 2022

(87) PCT Pub. No.: WO2021/015248
PCT Pub. Date: Jan. 28, 2021

(65) Prior Publication Data
US 2022/0272999 A1    Sep. 1, 2022

(30) Foreign Application Priority Data
Jul. 24, 2019   (JP) ................. 2019-136238

(51) Int. Cl.
A23G 1/30    (2006.01)
A23G 1/36    (2006.01)
A23G 9/28    (2006.01)

(52) U.S. Cl.
CPC ............. *A23G 1/305* (2013.01); *A23G 1/36* (2013.01); *A23G 9/288* (2013.01)

(58) Field of Classification Search
None
See application file for complete search history.

(56) References Cited

U.S. PATENT DOCUMENTS

| 5,532,021 A | 7/1996 | Kida et al. | |
| 2015/0164102 A1* | 6/2015 | Cruz | A23G 1/36 |
| | | | 426/607 |

FOREIGN PATENT DOCUMENTS

| JP | 8-89172 | 4/1996 |
| JP | 9-172972 | 7/1997 |
| JP | 2006-280209 | 10/2006 |
| JP | 2010-268749 | 12/2010 |
| JP | 2018-113863 | 7/2018 |
| JP | 2018-148848 | 9/2018 |
| JP | 6454804 | 1/2019 |
| WO | 2009/057451 | 5/2009 |

OTHER PUBLICATIONS

Office Action issued Aug. 30, 2022 in corresponding Japanese Patent Application No. 2019-136238, with English translation.
International Search Report issued Oct. 6, 2020 in International (PCT) Application No. PCT/JP2020/028496.
Notice of Reasons for Refusal issued Feb. 3, 2023 in corresponding Japanese Patent Application No. 2019-136238, with English-language translation.
International Preliminary Report on Patentability issued Jan. 25, 2022 in corresponding International (PCT) Patent Application No. PCT/JP2020/028496.

* cited by examiner

*Primary Examiner* — Jyoti Chawla
(74) *Attorney, Agent, or Firm* — Wenderoth, Lind & Ponack, L.L.P.

(57) ABSTRACT

A chocolate for frozen desserts having manufacturing suitability when combined with the frozen desserts, good hardness, good flavor, and good melting feeling in the mouth is provided.
The chocolate for frozen desserts comprises 15% by mass or more of a cacao component, 3 to 9% by mass of cocoa butter, and 43 to 50% by mass of oils or fats, wherein the oils or fats comprised in the chocolate satisfy the following conditions (a) to (c):
(a) comprise 10% by mass or less of a straight-chain saturated fatty acid having 14 or less carbon atoms as a constituent fatty acid;
(b) comprise 10 to 25% by mass of a straight-chain saturated fatty acid having 16 to 18 carbon atoms as a constituent fatty acid; and
(c) comprise 65 to 85% by mass of an unsaturated fatty acid as a constituent fatty acid.

9 Claims, 2 Drawing Sheets

CHOCOLATE FOR FROZEN DESSERTS AND FROZEN DESSERTS

CROSS-REFERENCE TO RELATED APPLICATIONS

The present application claims the benefit of priority based on Japanese Patent Application No. 2019-136238 filed Jul. 24, 2019 and the entire contents of which are incorporated herein by reference.

BACKGROUND OF THE INVENTION

Field of the Invention

The present invention relates to chocolate for frozen desserts. The present invention also relates to frozen desserts using chocolate for frozen desserts.

Background Art

Chocolate is used not only in products made of chocolate only but also in products made by combining chocolate and other food stuffs. Products made by combining chocolate and other food stuffs include a product made by combining chocolate and frozen desserts such as ice cream. For example, Patent Documents 1 to 3 propose chocolate for frozen desserts.

Recently, there is a demand for more delicious food stuffs despite of somewhat higher prices due to change of needs for food stuffs among consumers. There is also a need for more tasty products for frozen desserts such as ice cream. Therefore, when chocolate is used for frozen desserts, it is also required to have better flavor and melting feeling in the mouth, and to be tastier.

Since chocolate used for frozen desserts comes in contact with the frozen desserts, it solidifies faster than when used for ordinary confectioneries. When chocolate used for ordinary confectioneries is used for frozen desserts, production problems occur that chocolate is covered thick and chocolate solidifies before it covers the surface of the frozen desserts due to rapid solidification of the chocolate. In order to prevent this, viscosity is reduced by normally containing a large amount of oils or fats in the chocolate for frozen desserts; however, there was a risk that the chocolate becomes oily, impairing the flavor. In addition, when chocolate having a low viscosity such as chocolate for frozen desserts is used for frozen desserts filled in a container, there arised a problem in manufacturing that the chocolate flows down toward the bottom surface via the side wall of the container. Therefore, there is a demand for chocolate for frozen desserts having good flavor without oily flavor, while having manufacturing suitability when combined with the frozen desserts.

In addition to the fine flavor, it is also required for the recent frozen desserts to be easy to eat. One example of the easy to eat aspects of the frozen desserts is that they can be eaten immediately after taken out from the freezer. In order for the frozen desserts to be eaten immediately after they are taken out from the freezer, they need to be moderately hard immediately after they are taken out from the freezer, rather than being too hard during frozen storage. Therefore, as like the frozen desserts, chocolate used in frozen desserts need to be moderately hard just after they are taken out from the freezer.

PRIOR ART DOCUMENTS

Patent Documents

Patent Document 1: Japanese Patent Laid-Open Publication No. H9-172972
Patent Document 2: Japanese Patent Laid-Open Publication No. 2006-280209
Patent Document 3: Japanese Patent Laid-Open Publication No. 2010-268749

SUMMARY OF THE INVENTION

Accordingly, the object of the present invention is to provide chocolate for frozen desserts having manufacturing suitability when combined with the frozen desserts, good hardness, good flavor, and good melting feeling in the mouth.

The present inventors have conducted extensive studies in order to solve the above-mentioned problems. As a result, it has been found that the above-mentioned problems can be solved by satisfying specific conditions for oils or fats contained in the chocolate for frozen desserts, thereby completing the present invention.

That is, according to the present invention, the following invention is provided.

[1] Chocolate for frozen desserts comprising 15% by mass or more of a cacao component, 3 to 9% by mass of cocoa butter, and 43 to 50 Wo by mass of oils or fats, wherein the oils or fats comprised in the chocolate satisfy the following conditions (a) to (c):
  (a) comprise 10% by mass or less of a straight-chain saturated fatty acid having 14 or less carbon atoms as a constituent fatty acid;
  (b) comprise 10 to 25% by mass of a straight-chain saturated fatty acid having 16 to 18 carbon atoms as a constituent fatty acid; and
  (c) comprise 65 to 85% by mass of an unsaturated fatty acid as a constituent fatty acid.

[2] The chocolate for frozen desserts according to [1], wherein the oils or fats comprised in the chocolate satisfy the following condition (d):
  (d) a content of polyunsaturated fatty acid relative to the content of unsaturated fatty acid as the constituent fatty acids is 0.45 or less.

[3] The chocolate for frozen desserts according to [1] or [2], wherein the oils or fats comprised in the chocolate satisfy the following condition (e):
  (e) a solid fat content is 1 to 30% at 10° C., 1 to 20% at 20° C., and 3% or less at 35° C.

[4] The chocolate for frozen desserts according to any one of [1] to [3], wherein the oils or fats comprised in the chocolate comprise a lauric oil or fat and a liquid oil.

[5] The chocolate for frozen desserts according to any one of [1] to [4], wherein the chocolate for frozen desserts is chocolate used in a layer form for the top surface of the frozen dessert, the bottom surface of the frozen dessert, or between the frozen dessert.

[6] The chocolate for frozen desserts according to any one of [1] to [5], wherein the frozen dessert is a frozen dessert filled in a container.

[7] A frozen dessert using the chocolate for frozen desserts according to any one of [1] to [6].

[8] The frozen dessert according to [7], wherein the chocolate for frozen desserts is present in a layer form for the top surface of the frozen dessert, on the bottom surface of the frozen dessert, or between the frozen dessert.

[9] The frozen dessert according to [7] or [8], wherein the frozen dessert is filled in a container.

Effect of the Invention

The present invention makes it possible to provide chocolate for frozen desserts having manufacturing suitability when combined with the frozen desserts, good hardness, good flavor, and good melting feeling in the mouth. Furthermore, it is possible to provide a frozen dessert using such chocolate.

DETAILED DESCRIPTION OF THE INVENTION

<Chocolate for Frozen Desserts>

Figure 1:
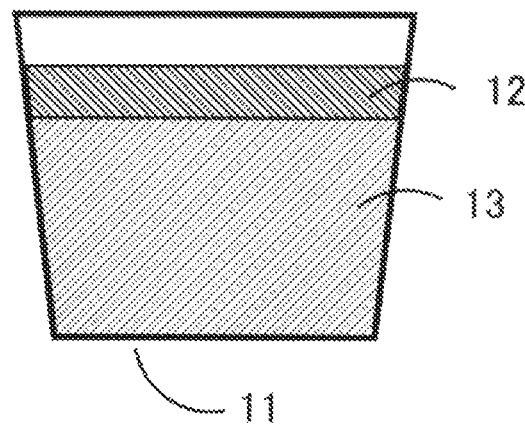
FIG. 1 is a schematic cross-sectional view showing one embodiment of chocolate for frozen desserts and a frozen dessert filled in a container.

The chocolate according to the present invention contains 15% by mass or more of a cacao component, 3 to 9% by mass of cocoa butter, and 43 to 50% by mass of oils or fats, and the oils or fats contained in the chocolate have a fatty acid composition satisfying specific conditions. Such chocolate has manufacturing suitability when combined with a frozen dessert, good hardness, good flavor, and good melting feeling in the mouth, and can be suitably used for a frozen dessert.

In the present invention, the term "chocolate" is not limited to chocolate as defined in the Fair Competition Code on the Labeling of Chocolates (National Council for Fair Trade of Chocolate Industry) or laws and regulations. Chocolate is a food stuff using an edible oil or fat, carbohydrate, cacao component, dairy product, flavoring agent, emulsifier and the like as raw materials, which is produced through production process of chocolate (all or a part of mixing process, refining process, conching process, molding process, cooling process, and the like), and the oil or fat forms a continuous phase. The chocolate in the present invention preferably has a water content of 3% by mass or less. In addition to dark chocolate and milk chocolate, the chocolate in the present invention also includes white chocolate, ruby chocolate and colour chocolate.

In the present invention, "cacao component" refers to cacao nibs, cacao mass, cocoa cake, cocoa powder, and cocoa butter.

In the present invention, "cocoa butter" includes not only cocoa butter mixed with chocolate but also cocoa butter contained in cacao nibs, cacao mass, cocoa cake, cocoa powder, and the like.

In the present invention, "oils or fats contained in chocolate" refer to all the oils or fats contained in chocolate, and include oils or fats (cocoa butter, milk fat, and the like) contained in oil-containing raw materials (cacao mass, cocoa powder, whole milk powder and the like) in addition to the oils or fats to be blended. For example, in general, the content of oil or fat (cocoa butter) in cacao mass is 54 to 56% by mass (oil content 0.54 to 0.56), the content of oil or fat (cocoa butter) in cocoa powder is 11 to 24% by mass (oil content 0.11 to 0.24), and the content of oil or fat (milk fat) in whole milk powder is 25% by mass (oil content 0.25), thus the content of oils or fats contained in chocolate is the total of the amount obtained by multiplying the blending amount (% by mass) of each raw material in chocolate by the oil content.

In the present invention, "frozen dessert" is not particularly limited as long as it can be eaten in a frozen state. Examples of the frozen dessert include ice cream, ice milk, and lact ice, which are specified by the "Ministerial Ordinance on Component Standards for Milk and Dairy Products", the so-called "Ministerial Ordinance on Milk, etc.", and frozen desserts specified by the "Standards for Food stuffs, Additives, etc." issued by the Ministry of Health, Labour and Welfare.

The chocolate according to the present invention comprises 15% by mass or more of a cacao component, preferably 15 to 40% by mass, and more preferably 15 to 25% by mass.

The chocolate according to the present invention comprises cocoa butter in an amount of 3 to 9% by mass, preferably 3 to 8.5% by mass, more preferably 3 to 8% by mass.

The chocolate according to the present invention comprises oils or fats in an amount of 43 to 50% by mass, preferably 43 to 49% by mass, and more preferably 44 to 49% by mass.

The oils or fats comprised in the chocolate according to the present invention satisfy at least the following condition (a).

(a) The oils or fats comprise 10% by mass or less of a straight-chain saturated fatty acid having 14 or less carbon atoms as a constituent fatty acid.

The oils or fats comprised in the chocolate according to the present invention preferably contain 0.1 to 8.0% by mass, more preferably 0.5 to 6.0% by mass, of a straight-chain saturated fatty acid having 14 or less carbon atoms as a constituent fatty acid.

The oils or fats comprised in the chocolate according to the present invention preferably comprise 10% by mass or less, more preferably 0.1 to 8.0% by mass, and further preferably 0.5 to 6.0% by mass, of a straight-chain saturated fatty acid having 12 to 14 carbon atoms as a constituent fatty acid.

The oils or fats comprised in the chocolate according to the present invention satisfy at least the following condition (b).

(b) The oils or fats comprise 10 to 25% by mass of a straight-chain saturated fatty acid having 16 to 18 carbon atoms as a constituent fatty acid.

The oils or fats comprised in the chocolate according to the present invention preferably comprise 12 to 23% by mass, more preferably 15 to 20% by mass, of a straight-chain saturated fatty acid having 16 to 18 carbon atoms as a constituent fatty acid.

The oils or fats comprised in the chocolate according to the present invention satisfy at least the following condition (c).

(c) The oils or fats comprise 65 to 85% by mass of an unsaturated fatty acid as a constituent fatty acid.

The oils or fats comprise in the chocolate according to the present invention preferably contain 68 to 84% by mass, more preferably 70 to 83% by mass of an unsaturated fatty acid as a constituent fatty acid.

It is preferable that the oils or fats comprised in the chocolate according to the present invention further satisfy the following condition (d).

(d) The content of the polyunsaturated fatty acid relative to the content of the unsaturated fatty acid as the constituent fatty acids is 0.45 or less.

In the oils or fats comprised in the chocolate according to the present invention, the content of polyunsaturated fatty acid relative to the content of unsaturated fatty acid as the constituent fatty acids is preferably 0.20 to 0.40, more preferably 0.25 to 0.35.

In the oils or fats comprised in the chocolate according to the present invention, the content of the trans fatty acid in the constituent fatty acids is preferably 10% by mass or less, more preferably 7% by mass or less, and further preferably 5% by mass or less.

In the present invention, the straight-chain saturated fatty acid having 14 or less carbon atoms preferably has 8 to 14 carbon atoms, and examples thereof include octanoic acid (8:0), decanoic acid (10:0), lauric acid (12:0), myristic acid (14:0), and the like.

In the present invention, the straight-chain saturated fatty acid having 16 to 18 carbon atoms include palmitic acid (16:0), stearic acid (18:0), and the like.

In the present invention, the unsaturated fatty acid preferably has 16 to 24 carbon atoms, more preferably has 18 carbon atoms, and examples thereof include palmitoleic acid (16:1), oleic acid (18:1), linoleic acid (18:2), and linolenic acid (18:3), and the like.

The above-mentioned numerical expression is a combination of the number of carbon atoms and the number of double bonds in the fatty acid. The polyunsaturated fatty acid is an unsaturated fatty acid having two or more double bonds.

It is preferable that the oils or fats contained in the chocolate according to the present invention further satisfy the following condition (e).

(e) The solid fat content (SFC) is 1 to 30% at 10° C., 1 to 20% at 20° C., and 3% or less at 35° C.

In the present invention, the solid fat content is preferably 1 to 20% at 10° C., 1 to 15% at 20° C., and 2% or less at 35° C., more preferably 1 to 15% at 10° C., 1 to 10% at 20° C., and 1% or less at 35° C.

The analysis of constituent fatty acids of oils or fats contained in the chocolate according to the present invention can be carried out using gas chromatography (according to AOCS Ce1f-96).

SFC of oils or fats contained in the chocolate according to the present invention can be measured according to "2.2.9-2003 Solid Fat Content (NMR Method)" in "Standard Methods for the Analysis of Fats, Oils and Related Materials" edited by the Japan Oil Chemist's Society.

The chocolate according to the present invention preferably contains a lauric oil or fat. The lauric oil or fat used in the chocolate according to the present invention is an oil or fat containing lauric acid as a constituent fatty acid in an amount of preferably 40% by mass or more, more preferably 40 to 60% by mass. Examples of the lauric oil or fat include palm kernel oil, coconut oil, and Babassu oil. Further examples include processed oils obtained by processing such as mixing and separating these oils or fats. Among these lauric oils or fats, coconut oil is preferable. One of these lauric oils or fats may be used alone or two or more in combination.

The content of the lauric oil or fat in the oils or fats contained in the chocolate according to the present invention is preferably 15% by mass or less, more preferably 10% by mass or less, and further preferably 7% by mass or less.

In the chocolate according to the present invention, the oils or fats contained preferably contain a liquid oil. The liquid oil used in the chocolate according to the present invention refers to an oil or fat that is liquid at 20° C. Examples of the liquid oil include soybean oil, rapeseed oil, corn oil, sunflower oil, safflower oil, sesame oil, cottonseed oil, rice oil, olive oil, peanut oil, and linseed oil. Further, examples of the liquid oil include processed oils or fats obtained by processing such as mixing and separation of these oils or fats. Preferred among these liquid oils are soybean oil and rapeseed oil. One of these liquid oils may be used alone or two or more in combination.

The content of the liquid oil in the oils or fats comprised in the chocolate according to the present invention is preferably 50 to 90% by mass, more preferably 52 to 88% by mass, and further preferably 55 to 85% by mass.

The blending ratio of the lauric oils or fats and the liquid oil used in the chocolate according to the present invention is preferably 0:100 to 20:80, more preferably 0:100 to 15:85, and further preferably 0:100 to 10:90.

The chocolate according to the present invention preferably contains a partially hydrogenated oil or fat. In the present invention, the partially hydrogenated oil or fat refers to an oil or fat obtained by adding hydrogen to the double bond of a part of the unsaturated fatty acid constituting the raw material partially hydrogenated oil or fat. The partially hydrogenated oil or fat is sometimes referred to as hydrogenated oil. The content of the trans-fatty acid in the partially hydrogenated oil or fat is preferably 10 to 60% by mass, more preferably 15 to 30% by mass.

The content of the partially hydrogenated oil or fat in the oils or fats comprised in chocolate according to the present invention is preferably 30% by mass or less, more preferably 5 to 25% by mass, and further preferably 8 to 20% by mass.

The chocolate according to the present invention can comprise oils or fats usually used for the production of chocolate such as milk fat, in addition to the lauric oil or fat, liquid oil, and partially hydrogenated oil or fat.

The chocolate according to the present invention can further contain a carbohydrate. Examples of the carbohydrate include sucrose (sugar and powdered sugar), lactose, glucose, fructose, maltose, hydrogenated starch syrup, liquid sugar, enzyme-converted starch syrup, isomerized starch syrup, sucrose-bound starch syrup, reducing sugar polydextrose, oligocarbohydrate, sorbitol, lactitol, trehalose, xylose, xylotol, maltitol, erythritol, mannitol, raffinose, and dextrin. The sugar content in the chocolate is preferably 25 to 60% by mass, more preferably 28 to 55% by mass, and further preferably 30 to 50% by mass.

The chocolate according to the present invention can be further mixed with a generally mixed raw material. Specifically, various powders such as, for example, milk products such as whole or non-fat milk powder, soy flour, soy protein, processed fruits, processed vegetables, powdered green tea, and powdered coffee, gums, starches, emulsifiers, antioxidants, colorants, and flavoring agents can be used.

The chocolate according to the present invention can be produced by using a conventionally known method for producing chocolate. The chocolate according to the present invention can be produced, for example, by using the above-mentioned raw materials and through a mixing process, a refining process, a conching process, a cooling process, and the like.

The chocolate according to the present invention is used for frozen desserts, and is preferably used in a layer form on for top surface or the bottom surface of the frozen dessert, or between the frozen dessert. The chocolate according to the present invention is preferably used for a frozen dessert filled in a container.

The frozen dessert according to the present invention uses the chocolate according to the present invention. The frozen dessert according to the present invention can be produced by combining the frozen dessert and chocolate by using a conventionally known method for producing frozen desserts. For example, the method for combining the chocolate according to the present invention with the frozen dessert includes filling, coating, pouring, sandwiching, and the like.

The form of combination of the chocolate according to the present invention and the frozen dessert is not particularly limited, and various forms can be used. For example, the chocolate according to the present invention may be present on the top surface or the bottom surface of the frozen desserts, or may be present in a layer form between the frozen desserts. The chocolate according to the present invention may be a combination of these forms, may be present only on a part of the top surface or bottom surface of the frozen dessert, or may be present in two or more layers between the frozen dessert. The chocolate may also be formed into a concave-shaped layer by filling it in the upper surface of the frozen dessert, etc. which is formed into a concave shape by using a cylindrical or prismatic cooled die, and then forming it into a concave-shaped layer by using a re-cooled die, etc. In addition to the frozen dessert, a dessert material such as mousse, jelly, jam, sauce, and the like may be filled inside the concave portion formed by the chocolate.

The frozen dessert according to the present invention is preferably filled in a container. The container for filling the chocolate and the frozen dessert according to the present invention is not particularly limited, and a container for food can be used. The material of the container is not particularly limited, and a container made of paper, plastic, glass, ceramic, metal, and the like can be used.

Figure 2:
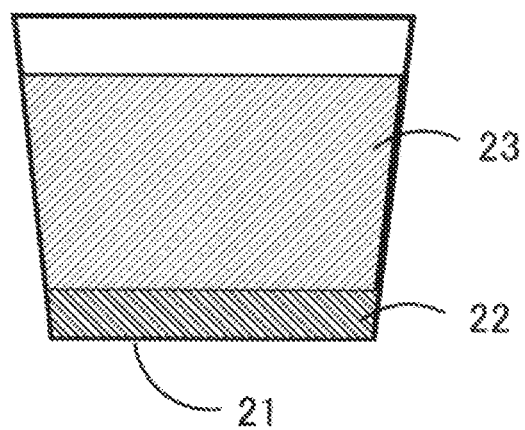
FIG. 2 is a schematic cross-sectional view showing one embodiment of chocolate for frozen desserts and a frozen dessert filled in a container.
Figure 3:
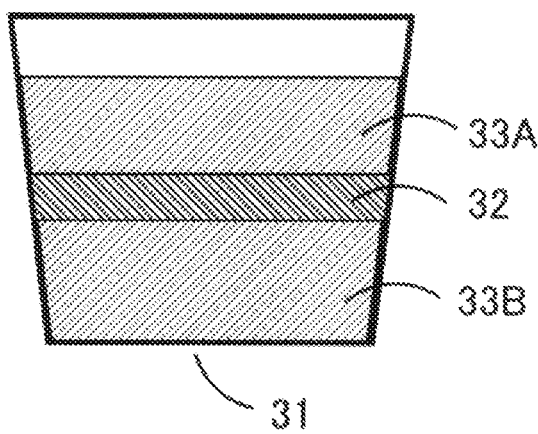
FIG. 3 is a schematic cross-sectional view showing one embodiment of chocolate for frozen desserts and a frozen dessert filled in a container.
Figure 4:
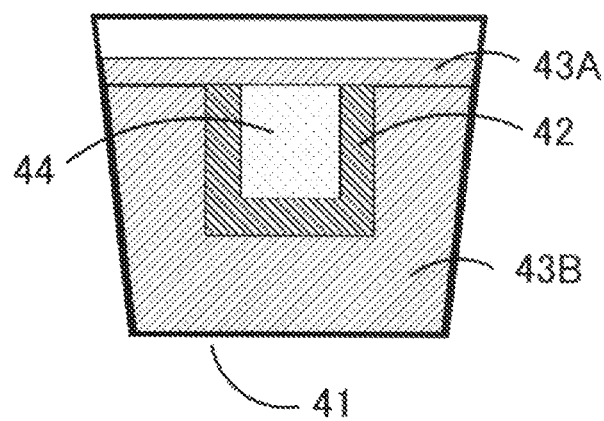
FIG. 4 is a schematic cross-sectional view showing one embodiment of chocolate for frozen desserts and a frozen dessert filled in a container.
Figure 5:
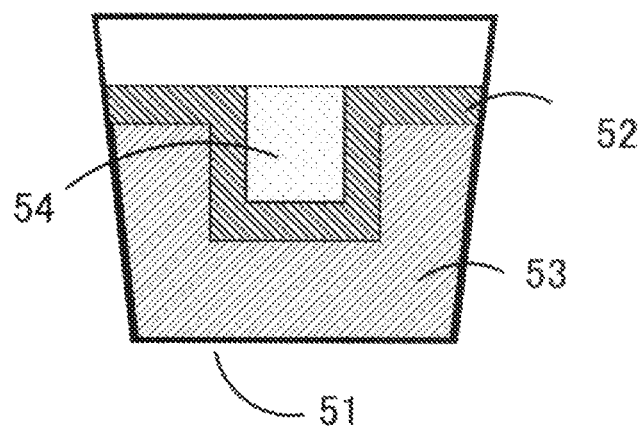
FIG. 5 is a schematic cross-sectional view showing one embodiment of chocolate for frozen desserts and a frozen dessert filled in a container.

FIGS. 1 to 5 are schematic cross-sectional views showing the embodiments of combinations of the chocolate according to the present invention and the frozen dessert. In FIG. 1, container 11 is sequentially filled with frozen dessert 13 and chocolate 12, and the chocolate 12 is present on the top surface of the frozen dessert 13. In FIG. 2, container 21 is sequentially filled with chocolate 22 and frozen dessert 23, and the chocolate 22 is present on the bottom surface of the frozen dessert 23. In FIG. 3, container 31 is sequentially filled with frozen dessert 33B, chocolate 32, and frozen dessert 33A, and chocolate 32 is present in a layer form between frozen dessert 33A and frozen dessert 33B. In FIG. 4, container 41 is sequentially filled with frozen dessert 43B, chocolate 42, dessert material 44, and frozen dessert 43A, and the chocolate 42 is present in a layer form formed into a concave shape between the frozen dessert 43A and frozen dessert 43B, and the dessert material 44 is present inside the concave chocolate 42. In FIG. 5, container 51 is sequentially filled with frozen dessert 53, chocolate 52, and desert material 54, and the chocolate 52 is present in a layer form formed into a concave shape on the top surface of the frozen dessert 53, and the dessert material 54 is present inside the concave chocolate 52. In FIGS. 1 to 5, the containers have spaces in the upper portions but the containers may be filled with chocolate, frozen dessert, or the desert material.

Examples

The present invention shall be described in more details with reference to the Examples. However, the present invention shall not be limited by these Examples.

<Analysis Method>

The analysis of constituent fatty acids of oils or fats contained in the chocolate according to the present invention was carried out by gas chromatography (according to AOCS Ce1f-96).

SFC of oils or fats contained in the chocolate according to the present invention was measured in accordance with "2.2.9-2003 Solid Fat Content (NMR Method)" in "Standard Methods for the Analysis of Fats, Oils and Related Materials" edited by the Japan Oil Chemist's Society.

<Raw Material Oils or Fats>

The following oils or fats were used as the raw material oils or fats.

Palm oil (lauric acid content: 47.9% by mass)
Rapeseed oil (State at 20° C.: liquid)
Partially hydrogenated oil or fat (trans-fatty acid content: 22.3% by mass)
Vegetable oil or fat 1 (product name: Sienta Soft N (manufactured by Nisshin Oilio Group Inc.))

<Production of Chocolate>

Chocolate was produced by a conventional method (mixing, refining, and conching) with the formulation (unit: parts by mass) described in Table 1.

Table 2 shows the content (unit: % by mass) of each component in the chocolate, the content (unit: % by mass) of lauric oil or fat, liquid oil, and partially hydrogenated oil or fat in the oils or fats, and the ratio (unit: % by mass) of lauric oil or fat and liquid oil. The moisture content of the chocolate was 1% by mass or less in all the formulations.

Table 3 shows the fatty acid composition (unit: % by mass) and the solid fat content (SFC) (unit: %) in the oils or fats.

TABLE 1

| | Chocolate Formulation (% by mass) | | | | | | | | | | |
|---|---|---|---|---|---|---|---|---|---|---|---|
| | Cacao mass | Cocoa powder | Cocoa butter | Whole milk powder | Sugar | Palm oil | Rapeseed oil | Partially hydrogenated oil or fat | Vegetable oil or fat 1 | Flavoring | Emulsifier | Total |
| Ex. 1 | 8.1 | 9.0 | 1.4 | 8.4 | 32.1 | 2.2 | 38.1 | 0.0 | 0.0 | 0.4 | 0.3 | 100.0 |
| Comp. Ex. 1 | 7.7 | 8.4 | 1.3 | 7.9 | 29.7 | 2.4 | 41.9 | 0.0 | 0.0 | 0.4 | 0.3 | 100.0 |
| Ex. 2 | 8.3 | 9.2 | 1.4 | 8.6 | 32.9 | 2.1 | 36.7 | 0.0 | 0.0 | 0.4 | 0.3 | 100.0 |
| Comp. Ex. 2 | 9.3 | 10.4 | 1.4 | 9.7 | 37.1 | 1.7 | 29.7 | 0.0 | 0.0 | 0.4 | 0.3 | 100.0 |
| Ex. 3 | 8.8 | 9.8 | 1.3 | 9.1 | 34.8 | 1.6 | 27.9 | 6.0 | 0.0 | 0.4 | 0.2 | 100.0 |
| Ex. 4 | 8.8 | 9.8 | 1.3 | 9.1 | 34.8 | 1.9 | 33.6 | 0.0 | 0.0 | 0.4 | 0.2 | 100.0 |

TABLE 1-continued

Chocolate Formulation (% by mass)

| | Cacao mass | Cocoa powder | Cocoa butter | Whole milk powder | Sugar | Palm oil | Rapeseed oil | Partially hydrogenated oil or fat | Vegetable oil or fat 1 | Flavoring | Emulsifier | Total |
|---|---|---|---|---|---|---|---|---|---|---|---|---|
| Ex. 5 | 8.8 | 9.8 | 1.3 | 9.1 | 34.8 | 1.6 | 27.9 | 0.0 | 6.0 | 0.4 | 0.2 | 100.0 |
| Comp. Ex. 3 | 8.8 | 9.8 | 4.2 | 9.1 | 34.8 | 1.8 | 30.9 | 0.0 | 0.0 | 0.4 | 0.2 | 100.0 |
| Comp. Ex. 4 | 8.8 | 9.8 | 9.2 | 9.1 | 34.8 | 1.5 | 26.2 | 0.0 | 0.0 | 0.4 | 0.2 | 100.0 |
| Ex. 6 | 8.8 | 9.8 | 1.3 | 9.1 | 34.8 | 0.0 | 35.5 | 0.0 | 0.0 | 0.4 | 0.2 | 100.0 |
| Ex. 7 | 8.8 | 9.8 | 1.3 | 9.1 | 34.8 | 0.4 | 35.2 | 0.0 | 0.0 | 0.4 | 0.2 | 100.0 |
| Comp. Ex. 5 | 8.8 | 9.8 | 1.3 | 9.1 | 34.8 | 7.1 | 28.4 | 0.0 | 0.0 | 0.4 | 0.2 | 100.0 |
| Comp. Ex. 6 | 8.8 | 9.8 | 1.3 | 9.1 | 34.8 | 8.9 | 26.7 | 0.0 | 0.0 | 0.4 | 0.2 | 100.0 |

TABLE 2

| | Content inside chocolate | | | | Content in oils or fats | | | Ratio of lauric oil or fat and liquid oil | |
|---|---|---|---|---|---|---|---|---|---|
| | Cacao content | Cocoa butter | Milk fat | Oil or fat | Lauric oil or fat | Liquid oil | Partially hydrogenated oil or fat | Lauric oil or fat | Liquid oil |
| Ex. 1 | 18.5 | 6.8 | 2.2 | 49.7 | 4.4 | 76.6 | 0.0 | 5.5 | 94.5 |
| Comp. Ex. 1 | 17.4 | 6.4 | 2.0 | 52.9 | 4.5 | 79.3 | 0.0 | 5.4 | 94.6 |
| Ex. 2 | 18.9 | 6.9 | 2.2 | 48.4 | 4.4 | 75.8 | 0.0 | 5.5 | 94.5 |
| Comp. Ex. 2 | 21.1 | 7.6 | 2.5 | 42.0 | 4.1 | 70.7 | 0.0 | 5.5 | 94.5 |
| Ex. 3 | 19.9 | 7.2 | 2.4 | 45.5 | 3.6 | 61.4 | 13.2 | 5.5 | 94.5 |
| Ex. 4 | 19.9 | 7.2 | 2.4 | 45.5 | 4.3 | 73.9 | 0.0 | 5.5 | 94.5 |
| Ex. 5 | 19.9 | 7.2 | 2.4 | 45.5 | 3.6 | 61.4 | 0.0 | 5.5 | 94.5 |
| Comp. Ex. 3 | 22.7 | 10.0 | 2.4 | 45.5 | 3.9 | 67.9 | 0.0 | 5.5 | 94.5 |
| Comp. Ex. 4 | 27.7 | 15.0 | 2.4 | 45.5 | 3.3 | 57.6 | 0.0 | 5.4 | 94.6 |
| Ex. 6 | 19.9 | 7.2 | 2.4 | 45.5 | 0.0 | 78.1 | 0.0 | 0.0 | 100.0 |
| Ex. 7 | 19.9 | 7.2 | 2.4 | 45.5 | 0.8 | 77.4 | 0.0 | 1.0 | 99.0 |
| Comp. Ex. 5 | 19.9 | 7.2 | 2.4 | 45.5 | 15.6 | 62.5 | 0.0 | 20.0 | 80.0 |
| Comp. Ex. 6 | 19.9 | 7.2 | 2.4 | 45.5 | 19.5 | 58.6 | 0.0 | 25.0 | 75.0 |

TABLE 3

| | Fatty acid composition in oils or fats | | | | | | | Solid fat content (SFC) | | |
|---|---|---|---|---|---|---|---|---|---|---|
| | C12-14 saturated | C14 or less saturated | C16-18 saturated | Unsaturated | Poly-unsaturated | Poly-unsaturated/Unsaturated | Trans-fatty acid | 10° C. | 20° C. | 35° C. |
| Ex. 1 | 3.8 | 4.5 | 16.1 | 78.2 | 23.4 | 0.30 | 1.3 | 9.4 | 3.3 | 0.0 |
| Comp. Ex. 1 | 3.8 | 4.5 | 14.9 | 79.4 | 24.0 | 0.30 | 1.3 | 7.8 | 2.3 | 0.1 |
| Ex. 2 | 3.8 | 4.5 | 16.6 | 77.7 | 23.2 | 0.30 | 1.3 | 9.9 | 3.2 | 0.0 |
| Comp. Ex. 2 | 3.8 | 4.6 | 19.3 | 74.9 | 21.8 | 0.29 | 1.3 | 13.4 | 5.3 | 0.0 |
| Ex. 3 | 3.2 | 3.9 | 17.3 | 77.4 | 20.4 | 0.29 | 4.1 | 12.6 | 5.2 | 0.7 |
| Ex. 4 | 3.8 | 4.5 | 17.6 | 76.6 | 22.7 | 0.30 | 1.3 | 11.4 | 4.0 | 0.1 |
| Ex. 5 | 3.4 | 4.0 | 19.3 | 75.2 | 21.8 | 0.29 | 1.2 | 12.9 | 5.1 | 0.6 |
| Comp. Ex. 3 | 3.6 | 4.3 | 21.2 | 73.3 | 21.1 | 0.29 | 1.2 | 16.8 | 7.6 | 0.1 |
| Comp. Ex. 4 | 3.2 | 3.8 | 27.4 | 67.5 | 18.3 | 0.27 | 1.1 | 26.3 | 15.8 | 0.2 |

TABLE 3-continued

| | Fatty acid composition in oils or fats | | | | | | | Solid fat content (SFC) | | |
|---|---|---|---|---|---|---|---|---|---|---|
| | C12-14 saturated | C14 or less saturated | C16-18 saturated | Unsaturated | Poly-unsaturated | Poly-unsaturated/Unsaturated | Trans-fatty acid | 10° C. | 20° C. | 35° C. |
| Ex. 6 | 0.9 | 1.1 | 17.4 | 80.2 | 23.9 | 0.30 | 1.3 | 11.7 | 4.4 | 0.0 |
| Ex. 7 | 1.5 | 1.7 | 17.4 | 79.6 | 23.6 | 0.30 | 1.3 | 11.3 | 4.3 | 0.1 |
| Comp. Ex. 5 | 11.5 | 13.6 | 18.3 | 67.0 | 19.5 | 0.29 | 1.1 | 15.0 | 3.8 | 0.0 |
| Comp. Ex. 6 | 14.1 | 16.8 | 18.5 | 63.6 | 18.4 | 0.29 | 1.1 | 17.1 | 4.1 | 0.2 |

<Evaluation of Chocolate>

Chocolates of Examples 1 to 7 and Comparative Examples 1 to 6 produced above were evaluated for chocolate filling suitability (spread of chocolate on the top surface of cup ice cream, liquid dripping at nozzle during filling, and running down of chocolate). The evaluation method was in accordance with "1) Filling evaluation method".

1) Filling Evaluation Method

1. Ice cream of an overrun 80 which was filled in a cup of 90 mm caliber and whose top surface was uniformly equalized was adjusted to −8° C. Next, using shower nozzles (124 nozzles of 2 mm inner diameter were arranged radially and uniformly on the filling surface of φ75), 20 g of chocolate for frozen desserts adjusted to 30° C. was filled from a height of 30 mm above the top surface of the ice cream.

2. The fact that "whether or not the chocolate can spread evenly over and cover (=spread) the top surface of the ice cream" during the period from the time when the filled chocolate touched the top surface of the ice cream until it solidified was evaluated in the following two steps. The evaluation results are shown in Table 4. "○" or higher was judged as acceptable.

(Evaluation Criteria)

○: Chocolate spread evenly on the top surface of the ice cream.

x: Chocolate did not spread evenly on the top surface of the ice cream, and a part of the chocolate solidified into a protrusion state at the end of filling.

3. After filling of the chocolate was completed, the fact that "the chocolate retained in the shower nozzles did not drip (=liquid drip)" was evaluated, and it was evaluated whether the chocolate had physical properties acceptable for practical use with the following three steps. The evaluation results are shown in Table 4. "○" or higher was judged as acceptable.

(Evaluation Criteria)

◎: No chocolate remained in the nozzles.

○: A small amount of chocolate remained in the nozzles, but no liquid dripping occurred within 3 seconds.

x: Chocolate remained in the nozzle, and liquid dripping occurred within 3 seconds.

4. After filling of the chocolate was completed, the fact that whether the chocolate flowed down from the top surface of the ice cream toward the bottom surface via the side wall of the container was evaluated in the following three steps. The evaluation results are shown in Table 4. Δ or higher was judged as acceptable.

(Evaluation Criteria)

○: Chocolate remained on the top surface of the ice cream and did not flow down toward the bottom surface at all.

Δ: Most of the chocolate remained on the top surface of the ice cream, but a part of it flowed down toward the bottom surface.

x: Most of the chocolate did not remain on the top surface of the ice cream and flowed down toward the bottom surface.

Subsequently, the chocolate filled according to "1) Filling evaluation method" was subjected to a sensory evaluation with respect to hardness (spoonable), flavor, and melting feeling in the mouth when the chocolate was eaten. The method was in accordance with "2) Sensory evaluation method of chocolate for coating".

2) Sensory Evaluation Method of Chocolate for Coating

1. Frozen dessert filled with chocolate according to "1) Filling evaluation method" was put in a rapid freezer for 1 hour and solidified.

2. Then transferred to a freezer at −18° C. and left for 7 days or more.

3. Evaluation was conducted by 3 people of an evaluation panel. Specifically, hardness (spoonable), flavor, and melting feeling in the mouth of chocolate when eaten were given scores in increments of 0.5 point from 1 to 5 points on the basis of "5: very good, 4: good, 3: somewhat good, 2: normal, 1: bad", and the average score of the 3 people is shown in Table 4. Cutoff point was 2.5 or more.

The chocolate according to the present invention satisfied the manufacturing suitability, was able to sufficiently spread on the top surface of 90 mm caliber cup ice cream at the time of filling to form a thick layer, and the sensory evaluation was good.

TABLE 4

| | Filling suitability evaluation | | | Sensory evaluation | | |
|---|---|---|---|---|---|---|
| | Spread on top surface | Liquid dripping at nozzles | Flowing down of chocolate | Hardness | Flavor | melting feeling in the mouth |
| Ex. 1 | ○ | ◎ | Δ | 5 | 3 | 4 |
| Comp. Ex. 1 | ○ | ◎ | X | 5 | 2.5 | 4 |
| Ex. 2 | ○ | ◎ | ○ | 4 | 3 | 4 |
| Comp. Ex. 2 | X | X | ○ | 3 | 4.5 | 2.5 |
| Ex. 3 | ○ | ○ | ○ | 3.5 | 5 | 3 |
| Ex. 4 | ○ | ○ | ○ | 3.5 | 3 | 3 |
| Ex. 5 | ○ | ○ | ○ | 3.5 | 3 | 3 |
| Comp. Ex. 3 | ○ | ○ | ○ | 3.5 | 2 | 2 |
| Comp. Ex. 4 | ○ | ○ | ○ | 3.5 | 2 | 2 |
| Ex. 6 | ○ | ○ | ○ | 5 | 4 | 4 |

TABLE 4-continued

| | Filling suitability evaluation | | | Sensory evaluation | | |
|---|---|---|---|---|---|---|
| | Spread on top surface | Liquid dripping at nozzles | Flowing down of chocolate | Hardness | Flavor | melting feeling in the mouth |
| Ex. 7 | ○ | ○ | ○ | 3 | 3 | 2.5 |
| Comp. Ex. 5 | ○ | ○ | ○ | 2 | 2 | 2 |
| Comp. Ex. 6 | ○ | ○ | ○ | 2 | 2 | 2 |

DESCRIPTION OF REFERENCE NUMERALS

11, 21, 31, 41, 51: Container
12, 22, 32, 42, 52: Chocolate
13, 23, 33A, 33B, 43A, 43B, 53: Frozen dessert (ice cream)
44, 54: dessert material

The invention claimed is:

1. Chocolate for frozen desserts comprising 15% by mass or more of a cacao component, 3 to 9% by mass of cocoa butter, and 43 to 50% by mass of oils or fats, wherein
the oils or fats comprised in the chocolate satisfy the following conditions (a) to (c):
(a) comprise 10% by mass or less of a straight-chain saturated fatty acid having 14 or less carbon atoms as a constituent fatty acid;
(b) comprise 10 to 25% by mass of a straight-chain saturated fatty acid having 16 to 18 carbon atoms as a constituent fatty acid; and
(c) comprise 65 to 85% by mass of an unsaturated fatty acid as a constituent fatty acid.

2. The chocolate for frozen desserts according to claim 1, wherein
the oils or fats comprised in the chocolate satisfy the following condition (d):
(d) a content of polyunsaturated fatty acid relative to the content of unsaturated fatty acid as the constituent fatty acids is 0.45 or less.

3. The chocolate for frozen desserts according to claim 1, wherein
the oils or fats comprised in the chocolate satisfy the following condition (e):
(e) a solid fat content is 1 to 30% at 10° C., 1 to 20% at 20° C., and 3% or less at 35° C.

4. The chocolate for frozen desserts according to claim 1, wherein
the oils or fats comprised in the chocolate comprise a lauric oil or fat and a liquid oil.

5. The chocolate for frozen desserts according to claim 1, wherein
the chocolate for frozen desserts is chocolate used in a layer form for the top surface of the frozen dessert, the bottom surface of the frozen dessert, or between the frozen dessert.

6. The chocolate for frozen desserts according to claim 1, wherein
the frozen dessert is a frozen dessert filled in a container.

7. A frozen dessert using the chocolate for frozen desserts according to claim 1.

8. The frozen dessert according to claim 7, wherein
the chocolate for frozen desserts is present in a layer form for the top surface of the frozen dessert, on the bottom surface of the frozen dessert, or between the frozen dessert.

9. The frozen dessert according to claim 7, wherein
the frozen dessert is filled in a container.

* * * * *